(No Model.)
F. R. HOYT.
PHOTOGRAPHIC SHUTTER.
No. 472,883. Patented Apr. 12, 1892.
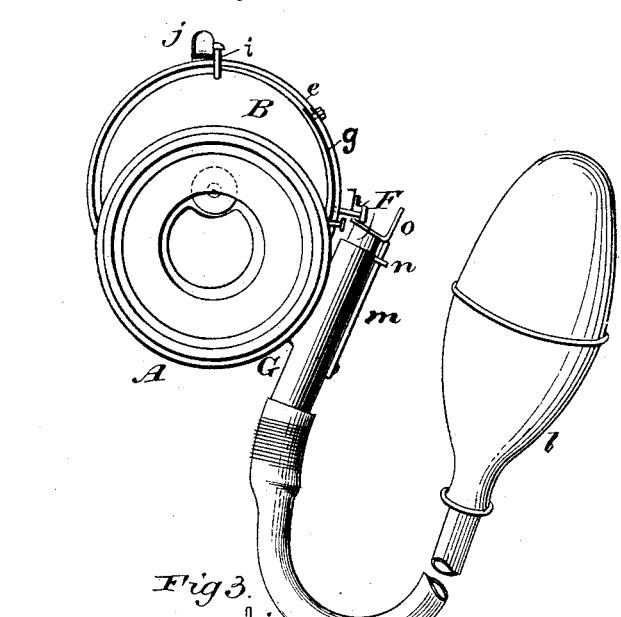
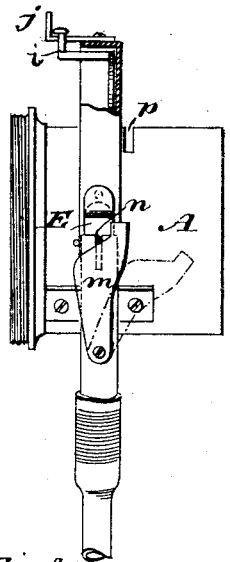
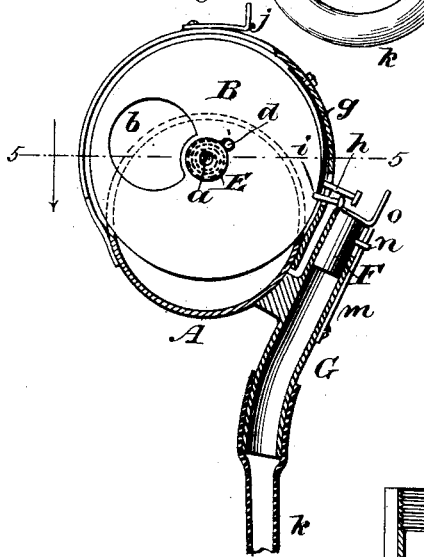
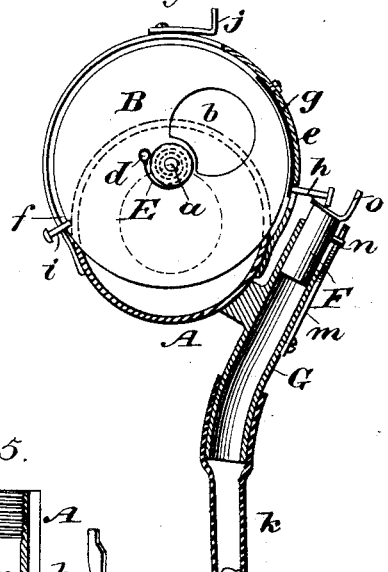
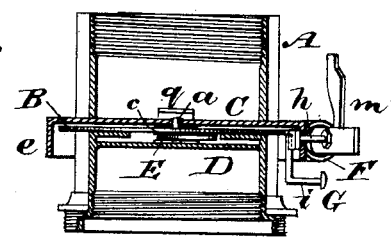
WITNESSES:
INVENTOR
BY
ATTORNEYS.

UNITED STATES PATENT OFFICE.

FRANK RODGERS HOYT, OF WATKINS, NEW YORK.

PHOTOGRAPHIC SHUTTER.

SPECIFICATION forming part of Letters Patent No. 472,883, dated April 12, 1892.

Application filed September 18, 1891. Serial No. 406,049. (No model.)

*To all whom it may concern:*

Be it known that I, FRANK RODGERS HOYT, of Watkins, in the county of Schuyler and State of New York, have invented a new and Improved Photographic Shutter, of which the following is a specification, reference being had to the annexed drawings, forming a part thereof, in which—

Figure 1 is a front elevation of my improved photographic shutter. Fig. 2 is a side elevation of the same. Fig. 3 is a front elevation, partly in section, showing the shutter closed and ready for disengagement. Fig. 4 shows the position of the shutter after it has been released, and Fig. 5 is a longitudinal section taken on line 5 5 in Fig. 3.

Similar letters of reference indicate corresponding parts in all the views.

The object of my invention is to construct a shutter for photographic cameras for instantaneous work, the said shutter being operated by a spring and released by a pneumatic piston.

The invention consists in the construction and combination of parts, as hereinafter fully described, and pointed out in the claim.

The camera-tube A is provided in the median line with a transverse slot, which is of sufficient width to receive the shutter B and the plate C, to which the shutter is pivoted. The shutter consists of a disk arranged to turn on the stud $a$ and provided with a circular aperture $b$, which nearly coincides with the opening of the permanent diaphragm D. To the stud $a$ is attached one end of a volute spring E, the other end of which is secured to a stud $d$, projecting from the shutter B. The stud $a$ is made revoluble, so that the tension of the spring E may be regulated. The portion of the plate C which projects beyond the tube A is inclosed in a rim $c$, which incloses the shutter B.

The shutter B is provided with a notch $f$ in its periphery, and to the rim $e$ on the inner side thereof is secured one end of a curved spring-catch $g$, the free end of which projects inward and is adapted to drop into the notch $f$ in the periphery of the disk. A stud $h$ projects from the free end of the spring-catch $g$ outwardly through the rim $e$, in position to be engaged by the pneumatic piston F, working in the cylinder G, attached to the side of the camera-tube A. The upper end of the piston F is beveled, so that when it strikes the head of the stud $h$ it tends to draw the said stud outwardly, and thus disengage the spring-catch $g$ from the shutter B. The shutter B is furnished with a handle $i$, which extends outwardly parallel with the axis of the camera-tube, and then in a radial direction a short distance beyond the rim $e$, thus affording means of setting the shutter. A stop $j$ is pivoted to the rim $e$ and is capable of being moved into the path of the handle $i$ when it is desired to stop the shutter and hold it in an open position for time exposure or for focusing.

A rubber tube $k$, connected with the pneumatic cylinder G, is attached to a pneumatic bulb $l$, so that when the shutter is set by compressing the bulb the piston F is forced outwardly, releasing the shutter by engaging the stud $h$ and drawing out the curved spring-catch $g$, allowing the shutter to escape, when the volute spring E turns the shutter and effects the exposure of the plate. A latch $m$, pivoted to the side of the pneumatic cylinder, is provided for holding the piston F in a projected position, said latch having an inclined surface on the end for engaging the stud $n$, which projects from the piston through a slot in the side of the pneumatic cylinder. The piston F carries on its outer end a guard $o$, which prevents the accidental release of the shutter by preventing the fingers or the clothing from coming in contact with the stud $h$.

The tube A is provided with a slot $p$ back of the plate C for the insertion of the removable diaphragm. The lower ends of the said diaphragms are received in a hook $q$, attached to the inner portion of the plate C.

Having thus described my invention, I claim as new and desire to secure by Letters Patent—

In a camera-shutter, the combination, with a support and a pivoted and spring-actuated shutter carried by the support and provided with a notch in its periphery, of a spring-catch having one end secured to the support and its free end engaging the notch of the shutter, said free end being provided with a stud, a pneumatic cylinder, and a piston in the cylinder, having a beveled upper end adapted to engage the stud of the catch, substantially as and for the purpose set forth.

FRANK RODGERS HOYT.

Witnesses:
E. W. COPELAND,
A. H. REYNOLDS.